(12) United States Patent
Budge et al.

(10) Patent No.: US 11,167,494 B2
(45) Date of Patent: Nov. 9, 2021

(54) 3D PRINTING METHOD AND APPARATUS

(71) Applicant: Aurora Labs Limited, Bibra Lake (AU)

(72) Inventors: David Budge, Bibra Lake (AU); John Nathan Henry, Bibra Lake (AU)

(73) Assignee: Aurora Labs Limited, Bibra Lake (AU)

( * ) Notice: Subject to any disclaimer, the term of this patent is extended or adjusted under 35 U.S.C. 154(b) by 293 days.

(21) Appl. No.: 16/346,900

(22) PCT Filed: Oct. 31, 2017

(86) PCT No.: PCT/AU2017/000230
§ 371 (c)(1),
(2) Date: May 2, 2019

(87) PCT Pub. No.: WO2018/081848
PCT Pub. Date: May 11, 2018

(65) Prior Publication Data
US 2019/0315064 A1 Oct. 17, 2019

(30) Foreign Application Priority Data
Nov. 2, 2016 (AU) .............................. 2016904476

(51) Int. Cl.
*B29C 64/329* (2017.01)
*B33Y 10/00* (2015.01)
(Continued)

(52) U.S. Cl.
CPC .......... *B29C 64/329* (2017.08); *B29C 64/153* (2017.08); *B33Y 10/00* (2014.12); *B33Y 30/00* (2014.12)

(58) Field of Classification Search
CPC ..... B29C 64/329; B29C 64/153; B33Y 10/00; B33Y 30/00
See application file for complete search history.

(56) References Cited

U.S. PATENT DOCUMENTS 5,160,822 A 11/1992 Aleshin
5,555,481 A 9/1996 Rock
(Continued)

FOREIGN PATENT DOCUMENTS

WO 1997/09141 3/1997
WO 2005/089090 9/2005
(Continued)

OTHER PUBLICATIONS

International Search Report, PCT/AU2017/000230, dated Mar. 1, 2018.
Written Opinion, PCT/AU2017/000230, dated Mar. 1, 2018.

*Primary Examiner* — Yung-Sheng M Tsui
*Assistant Examiner* — Melody Tsui
(74) *Attorney, Agent, or Firm* — Andrus Intellectual Property Law, LLP

(57) ABSTRACT

A printing apparatus is for printing a three-dimensional object having an operative surface; a plurality of supply hoppers for dispensing powder, the powder being adapted to be melted by an energy beam, wherein the supply hoppers are configured to form a plurality of vertically-aligned powder beds adjacent to one another on the operative surface simultaneously; and an energy source for emitting an energy beam onto each powder bed simultaneously to melt or fuse a topmost layer of the powder bed onto an underlying powder bed layer or substrate.

17 Claims, 5 Drawing Sheets

(51) Int. Cl.
  *B33Y 30/00* (2015.01)
  *B29C 64/153* (2017.01)

(56) References Cited

U.S. PATENT DOCUMENTS

| | | | |
|---|---|---|---|
| 5,837,960 | A | 11/1998 | Lewis et al. |
| 6,376,148 | B1 | 4/2002 | Liu |
| 6,780,368 | B2 | 8/2004 | Liu |
| 6,811,744 | B2 | 11/2004 | Keicher et al. |
| 7,537,722 | B2 | 5/2009 | Andersson |
| 9,044,841 | B2 | 6/2015 | Tian |
| 9,352,420 | B2 | 5/2016 | Whitfield |
| 9,573,225 | B2 | 2/2017 | Buller et al. |
| 2002/0106054 | A1 | 8/2002 | Caflisch |
| 2003/0074096 | A1* | 4/2003 | Das .................. B29C 64/153 700/119 |
| 2003/0206820 | A1 | 11/2003 | Keicher et al. |
| 2009/0206065 | A1 | 8/2009 | Kruth et al. |
| 2013/0108726 | A1 | 5/2013 | Uckelmann et al. |
| 2013/0264750 | A1 | 10/2013 | Hofacker et al. |
| 2013/0280547 | A1 | 10/2013 | Brandl et al. |
| 2013/0319325 | A1 | 12/2013 | Whitfield |
| 2014/0106088 | A1 | 4/2014 | Bilaine |
| 2015/0029259 | A1 | 1/2015 | Humet et al. |
| 2015/0082925 | A1 | 1/2015 | Humet et al. |
| 2015/0174658 | A1 | 6/2015 | Ljungblad |
| 2015/0290710 | A1 | 10/2015 | Ackelid |
| 2015/0306666 | A1* | 10/2015 | Honda ................. B29C 64/255 425/78 |
| 2015/0314528 | A1 | 11/2015 | Gordon |
| 2015/0367415 | A1 | 12/2015 | Buller |
| 2016/0052014 | A1 | 2/2016 | Halder et al. |
| 2016/0067928 | A1* | 3/2016 | Mark .................... B33Y 10/00 264/401 |
| 2016/0107380 | A1 | 4/2016 | Smoot |
| 2016/0368055 | A1* | 12/2016 | Swaminathan ........ B33Y 50/02 |
| 2017/0021455 | A1 | 1/2017 | Dallarosa |
| 2017/0072466 | A1* | 3/2017 | Zehavi .................... B22F 10/70 |
| 2017/0072636 | A1* | 3/2017 | Ng ....................... B29C 64/205 |
| 2017/0129052 | A1 | 5/2017 | Buller |
| 2017/0157841 | A1* | 6/2017 | Green ................... B29C 64/393 |
| 2017/0182556 | A1* | 6/2017 | Ramaswamy ...... B28B 17/0081 |
| 2017/0216915 | A1* | 8/2017 | Holcomb ................ B22F 3/105 |
| 2017/0326681 | A1 | 11/2017 | Sidhu |
| 2018/0361663 | A1* | 12/2018 | Burt ....................... B33Y 30/00 |

FOREIGN PATENT DOCUMENTS

| | | |
|---|---|---|
| WO | 2008/147306 | 12/2008 |
| WO | 2015/001241 | 1/2015 |
| WO | 2015/040433 | 3/2015 |
| WO | 2015094720 | 6/2015 |
| WO | 2016009426 | 1/2016 |
| WO | 2016/044876 | 3/2016 |

* cited by examiner

3D PRINTING METHOD AND APPARATUS

CROSS-REFERENCE TO RELATED APPLICATIONS

This application is the U.S. national stage application of International Application PCT/AU2017/000230, filed Oct. 31, 2017, which international application was published on May 11, 2018, as International Publication WO 2018/081848 in the English language. The International Application claims priority of Australian Patent Application No. 2016904476, filed Nov. 2, 2016. The international application and Australian application are both incorporated herein by reference, in entirety.

FIELD OF INVENTION

The present invention relates to a 3D printing method and apparatus.

More particularly, the present invention relates to a 3D printing method and apparatus for manufacturing objects at high speed.

BACKGROUND ART

Three-dimensional (3D) printed parts result in a physical object being fabricated from a 3D digital image by laying down consecutive thin layers of material.

Typically these 3D printed parts can be made by a variety of means, such as selective laser melting or sintering, which operate by having a powder bed onto which an energy beam is projected to melt the top layer of the powder bed so that it welds onto a substrate or a substratum. This melting process is repeated to add additional layers to the substratum to incrementally build up the part until completely fabricated.

These printing methods are significantly time consuming to perform and it may take several days, or weeks, to fabricate a reasonable sized object. The problem is compounded for complex objects comprising intricate component parts, particularly metal parts. This substantially reduces the utility of 3D printers and is one of the key barriers currently impeding large-scale adoption of 3D printing by consumers and in industry.

The present invention attempts to overcome, at least in part, the aforementioned disadvantages of previous 3D printing methods and devices.

SUMMARY OF THE INVENTION

In accordance with one aspect of the present invention, there is provided a printing apparatus for printing a three-dimensional object, comprising:
  an operative surface;
  a plurality of supply hoppers for dispensing powder, the powder being adapted to be melted by an energy beam, wherein the supply hoppers are configured to form a plurality of vertically-aligned powder beds adjacent to one another on the operative surface simultaneously; and
  an energy source for emitting an energy beam onto each powder bed simultaneously to melt or fuse a topmost layer of the powder bed onto an underlying powder bed layer or substrate.

The supply hoppers may be configured to form powder beds in the form of vertically aligned columns on the operative surface, each column forming a cross sectional part of the three-dimensional object.

The supply hoppers may be configured such that powder is dispensed onto each individual powder bed to form successive overlying layers on the powder bed.

Each supply hopper may travel along an oscillating path that is substantially sinusoidal.

Each supply hopper may travel along an oscillating path that conforms to a square, triangular or other wave form.

The apparatus may further comprise an energy splitting means configured to split a single energy beam into a plurality of individual directed energy beams.

The apparatus may comprise a scanning means for determining a position, velocity and/or size of one or more particles comprised in powder travelling from the supply hoppers to each powder bed.

The scanning means may be adapted to measure a volume of powder comprised in each powder bed.

The scanning means may be adapted to measure a level of powder comprised in each powder bed.

The scanning means may be adapted to measure a topology of each powder bed or part thereof.

The scanning means may be adapted to measure a chemical composition of each powder bed or part thereof.

The scanning means may be adapted to measure a temperature of each powder bed or part thereof.

The apparatus may comprise a leveling means for substantially leveling a topmost layer of powder on each powder bed.

The leveling means may comprise a blade that, in use, periodically scrapes an upper surface of the topmost layer of powder on each powder bed.

The leveling means may comprise an electrostatic charging means.

The leveling means may comprise a vibration generation means for applying vibrational forces to loose powder disposed on each powder bed.

The vibration generation means may comprise a mechanical vibration generator.

The vibration generation means may comprise an ultrasonic vibration generator.

In accordance with one further aspect of the present invention, there is provided a method for printing a three-dimensional object, the method comprising the steps of:
  dispensing powder onto an operative surface such that a plurality of powder beds are formed simultaneously on the operative surface adjacent to one another;
  emitting an energy beam onto each powder bed simultaneously to melt or fuse a topmost layer of the powder bed onto an underlying layer or substrate and form part of the three-dimensional object; and
  repeating the steps above until the three-dimensional object is completely formed.

BRIEF DESCRIPTION OF DRAWINGS

The present invention will now be described, by way of example, with reference to the accompanying drawings, in which.

DETAILED DESCRIPTION OF THE DRAWINGS

Figure 1:
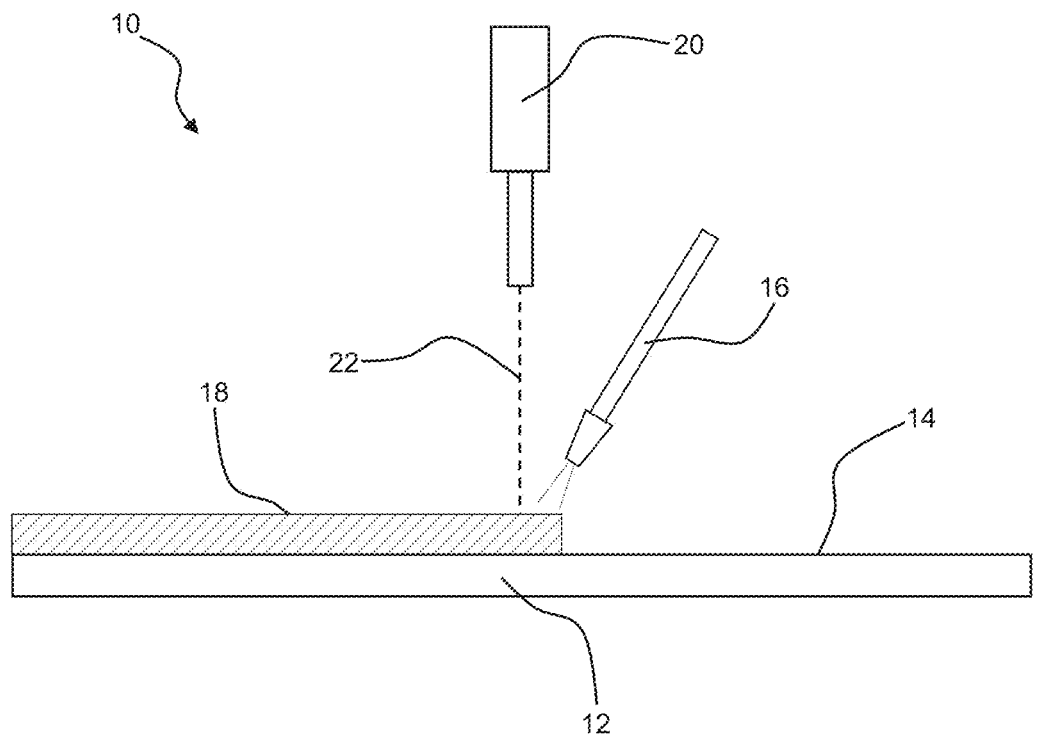
FIG. 1 is a side schematic view of a conventional 3D printing apparatus known in the art.

Referring to FIG. 1, there is shown a schematic representation of a conventional 3D printing apparatus 10 known in the art. The apparatus 10 comprises a substrate 12 with an operative surface 14 on which a printed object is to be fabricated by 3D printing.

The apparatus 10 further comprises a supply hopper 16 that deposits a single layer of powder 18 onto the operative surface 14.

An energy gun 20 (commonly a laser or electron gun) emits an energy beam 22 onto the layer of powder 18 causing it to melt or sinter selectively to form an individual layer of the 3D object. The process is repeated to add additional layers and incrementally build up the object until it is completed.

Figure 2:
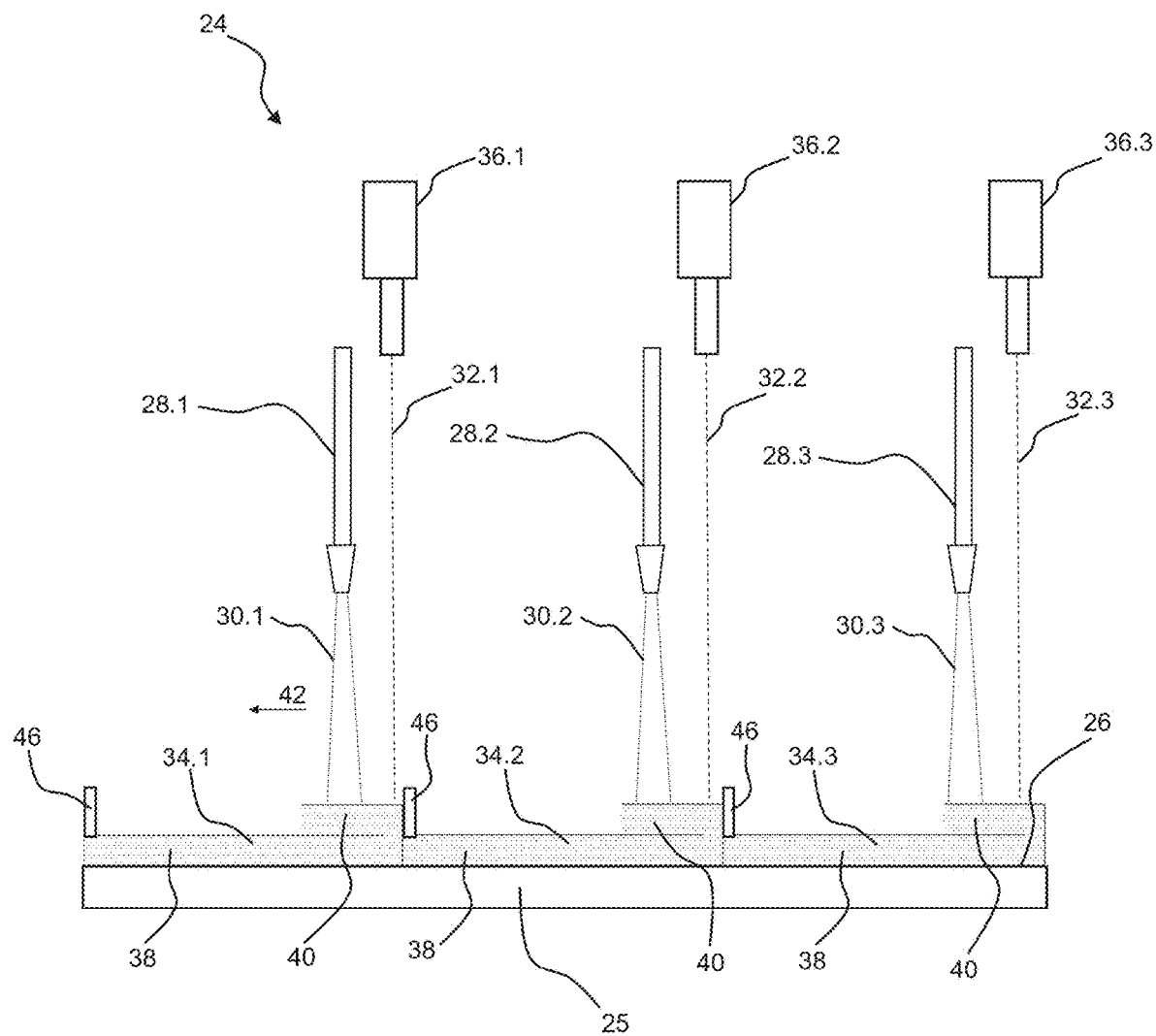
FIG. 2 is a side schematic view of a 3D printing apparatus according to an embodiment of the present invention.
Figure 3:
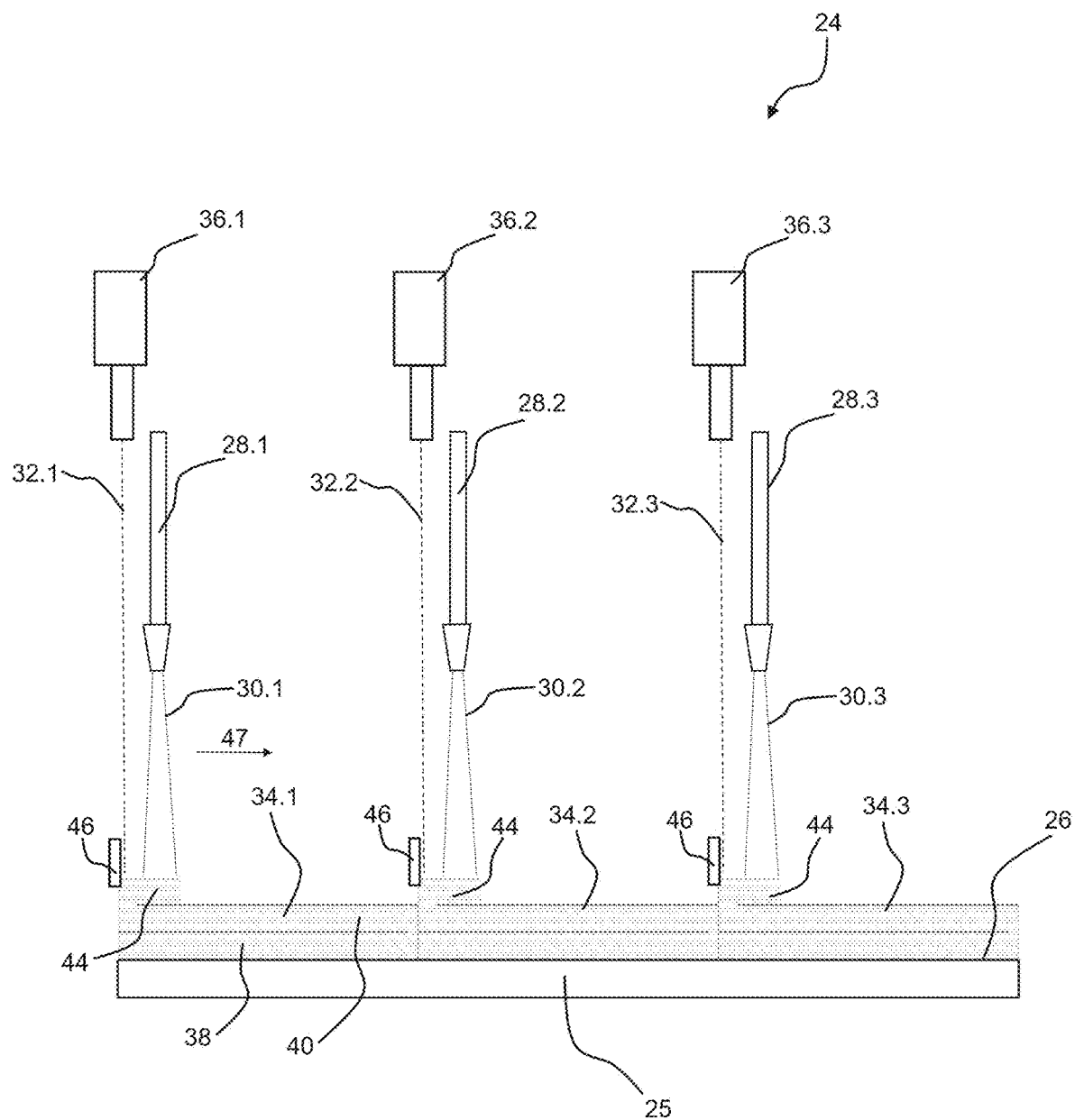
FIG. 3 is a further side schematic view of the 3D printing apparatus of FIG. 2.

Referring to FIGS. 2 and 3, there is shown a schematic representation of a printing apparatus for printing a three-dimensional object 24 according to a first embodiment of the present invention.

The apparatus 24 comprises a substrate 25 having an operative surface 26 on which a printed object is to be fabricated by 3D printing. The apparatus 24 further comprises a plurality of supply hoppers 28 for dispensing powder 30, the powder 30 being adapted to be melted by an energy beam 32. The supply hoppers 28 are configured to form a plurality of powder beds 34 adjacent to one another on the operative surface 26 simultaneously.

The apparatus 24 further comprises an energy source for emitting an energy beam 32 onto each powder bed 34 simultaneously to melt or fuse a topmost layer of the powder bed 34 to an underlying powder bed layer or substrate. The energy source comprises a plurality of energy guns 36 configured to emit an individual energy beam 32 onto each powder bed 34.

Each energy gun 36 used in the apparatus 10 is, preferably, either one of a laser beam, a microwave beam, an ultrasonic beam, a collimated light beam, a micro-plasma welding arc, an electron beam, a particle beam or other suitable energy beam.

In use, each supply hopper 28 travels in alternating directions substantially above each part of the operative surface 26 on which a relevant powder bed 34 is to be formed. This provides that successive overlying layers of powder are formed on each powder bed 34 simultaneously.

For example, in FIG. 2 the apparatus 24 is shown in a state whereby a first layer of powder 38 has been deposited in full on each powder bed 34 and the supply hoppers 28 are actively depositing a second layer of powder 40 immediately above the first layers 38 simultaneously. The supply hoppers 28 are shown currently traveling in the direction indicated by reference numeral 42 while the second layers of powder 40 are being formed.

In FIG. 3, the apparatus 24 is shown in a further state whereby the first and second layers of powder 38,40 have both been deposited in full and the supply hoppers 28 are simultaneously depositing a third layer of powder 44, immediately above the second layers 40, on each powder bed 34. The supply hoppers 30 are shown currently traveling in the direction indicated by reference numeral 47, which is transverse to the first direction 42, while the third layers 44 are being formed.

The supply hoppers 28 travel back and forth repeatedly, in an oscillating path, to incrementally deposit the powder beds 34 onto the operative surface 26. Preferably, the path followed by the supply hoppers 28 is substantially sinusoidal in at least one dimension transverse to the planar operative surface 26. The supply hoppers 28 may, however, follow alternative oscillating paths which are all within scope of the present invention.

Preferably, the layers are deposited onto each of the powder beds 34 to form vertically aligned columns, each column forming a cross sectional part of the 3D object being fabricated.

Figure 5A:
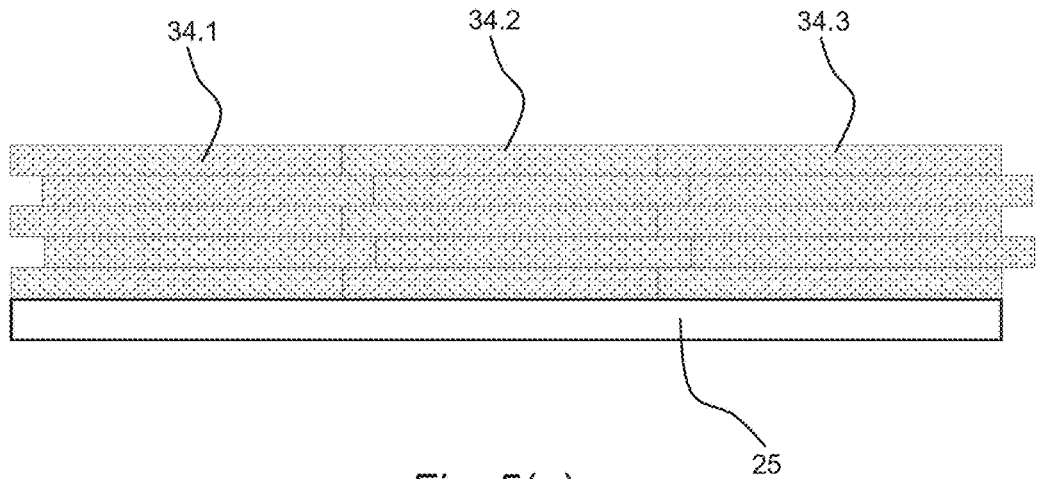
FIGS. 5(a)-5(c) each provide a side schematic view of a plurality of powder beds formed using a 3D printing apparatus according to a further embodiment of the present invention.
Figure 5B:
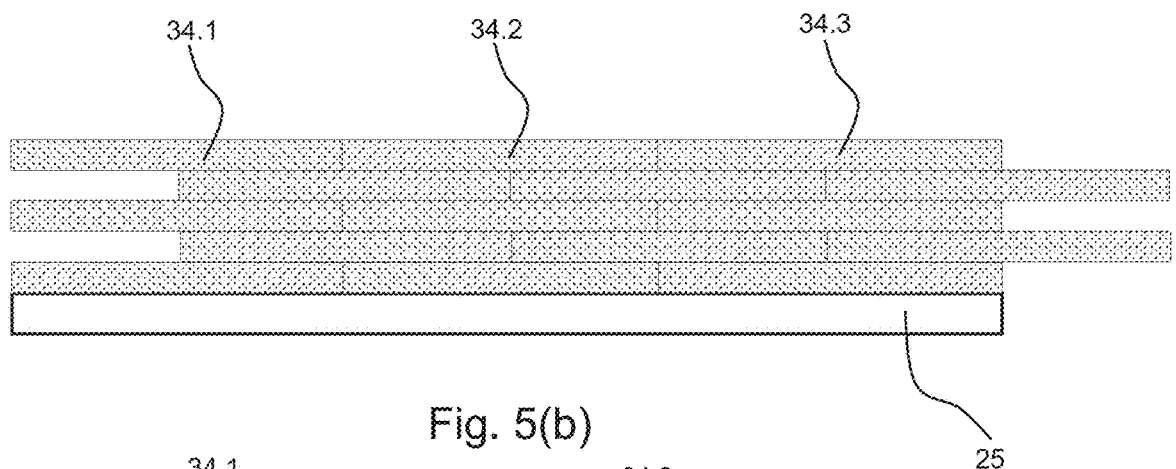

Preferably, the layers are deposited onto the columns such that the layers are aligned uniformly above one another. Alternatively, as shown in FIGS. 5(a) and 5(b) the layers may be deposited onto the columns such that each layer overlaps, at least in part, an underlying layer of powder in an adjacent column of powder.

The degree of overlap may be fixed. For example, in FIG. 5(a) each layer of powder is shown overlapping the relevant underlying/adjacent powder layer by about 10%. In FIG. 5(b), each layer of powder is shown overlapping the relevant underlying/adjacent powder layer by about 50%.

Figure 5C:
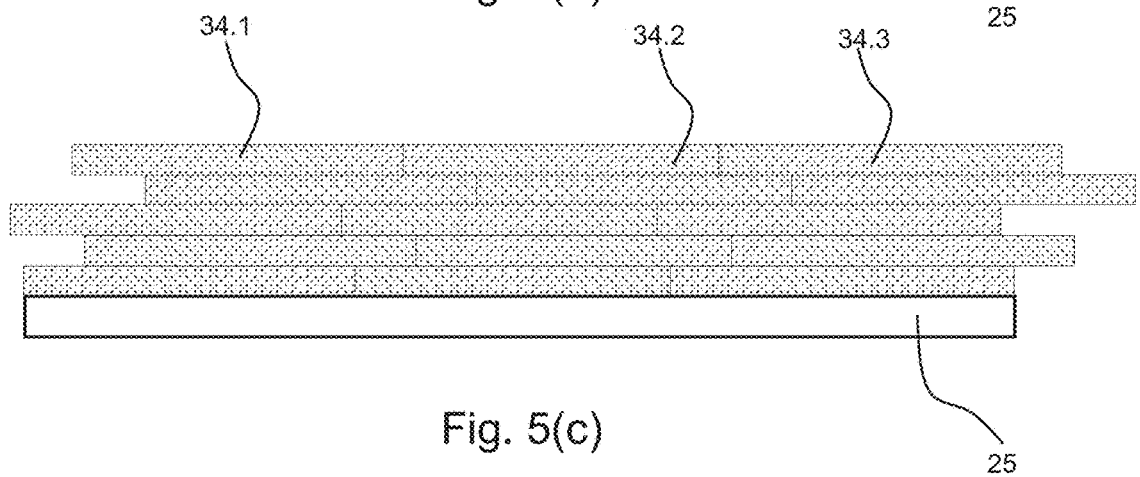

Alternatively, as shown in FIG. 5(c), the degree of overlap may vary according to a pre-determined or random sequence between respective layers.

Returning now to FIG. 2, while the topmost layer of powder is being deposited onto each powder bed 34 by the supply hoppers 28, the energy guns 36 are directed onto the layers to melt or sinter the powder selectively, thereby forming part of the 3D object.

The invention enables multiple adjacent powder beds 34 to be deposited and operated on by the energy sources simultaneously, which leads to a substantial increase in printing productivity. In the exemplary embodiment depicted in the FIGS. 2 and 3, three powder beds 38 and shown being formed on the operative surface 26, and being operated on by three energy guns 36, simultaneously. This leads to a corresponding three-fold increase in printing productivity.

However, it will be appreciated that, more generally, N supply hoppers and N energy guns may be used in accordance with the present invention to achieve an N-fold increase in printing productivity.

In embodiments of the invention that make use of electron beam energy sources, the printing apparatus 24 (including the substrate 25 and operative surface 26) is contained and operated wholly inside a vacuum chamber to facilitate propagation of the electron beam onto the powder beds 34.

The effectiveness of the present invention substantially relies on each powder bed 34 being formed in a controlled manner. It is, in particular, important to ensure that the layers formed on each powder bed 34 have uniform thicknesses and top surfaces that are substantially level when the topmost layers of the powder beds 34 are being worked on by the energy source.

Due to the nature of powder particles, they often tend to roll across the operative surface 26 when deposited thereon. This is normally either due to the shape of the powder particles, e.g. roughly round shaped powder particles that bounce roll on the operative surface 26 and collide with other powder particles already located thereon, or the rolling can be caused by the force of the gas feed carrying the powder particles from the powder supply 28, or the rolling can be caused by gravity by the powder particles rolling off a "heap" if too many powder particles are deposited at the same position.

It is also known that the thickness of a deposited layer of powder can be reduced after the layer has been worked on by the energy source due to, for example, particle shrinkage. The reduction in thickness may detrimentally affect layers of powder subsequently deposited by the supply hoppers 30 and/or the resultant 3D object that is fabricated.

The apparatus 24 may, therefore, additionally comprise a leveling means for substantially leveling the topmost layer of each powder bed 34 during operation. In the embodiment disclosed in the Figures, the leveling means comprises a plurality of blades 46 that, in use, are periodically scraped over the topmost layers of each powder bed 34 in order to modify its thickness, as may be necessary, and to ensure that its top surface is kept substantially level.

Each blade 46 is controlled using mechanical control means and control electronics (not shown) driven by software or firmware implementing an algorithm for controlling the position, speed and orientation of the blade 46.

The algorithm implemented causes each blade 46 to operate selectively on the powder beds 34, either in whole or in part, simultaneously with or independently to the operation of the energy guns 36.

Instead of or in addition to the blades 46, the leveling means used by the apparatus 24 may, alternatively, comprise a vibration generation means (not shown) for applying vibrational forces to the layers of powder in each powder bed 34. These vibrational forces cause individual loose particles in the powder layers to vibrate which, in turn, causes them to become dynamic. The vibrational forces may be applied selectively until the particles comprised in the layers form and settle into a desired arrangement.

The vibration generation means used by the apparatus 24 may be a mechanical vibration generator or, alternatively, an ultra-sonic vibration generator.

Further, instead of or in addition to the blade and/or vibration generation means, the leveling means may comprise an electrostatic charging means which electrostatically charges both the powder particles and the operative surface 26 with opposed polarities.

For example, a positive charge can be applied to the operative surface 26 and the powder particles exiting each powder hopper 28 can be negatively charged. Thus, as the powder particles exit the hoppers 28 they are drawn towards the operative surface 26 and, once contact is made therewith, the powder particles stick in place on the operative surface 26.

Advantages of such adhesion is, firstly, that it results in an improved resolution of the final component as the powder particles can be accurately placed and, secondly, that working environment within the printing apparatus 24 is improved as there is less powder particle dust between the supply hoppers 28 and the operative surface 26. Further, it is also possible to control the direction of flow of the electrostatically charged powder particles using other electrostatic means.

To enable the apparatus 24 to control the volumetric flow rate and density of airborne powder 30 emitted from the supply hoppers 28 and the leveling means described above, the apparatus 24, preferably, also comprises a scanning means (not shown).

The scanning means is, preferably, adapted to determine a position, velocity and/or size of one or more particles comprised in the powder 30 when the, or each, particle is travelling from the supply hoppers 28 to each powder bed 34 on the operative surface 26.

The scanning means is, preferably, also adapted to measure the airborne density of the powder 30.

The scanning means is, preferably, also adapted to measure a volume of powder deposited on the operative surface 26.

The scanning means is, preferably, also adapted to measure a level of the powder deposited on the operative surface 26.

The scanning means may make use of an ultra-sonic beam, an electron beam, a laser or other appropriate scanning or positioning technology.

Information and data collected using the scanning means is used, in conjunction with control electronics and software, to determine the volumetric flow rate, direction and/or velocity of powder emitted from the supply hoppers 28 and/or the direction and intensity of the energy beams 32 to optimise fabrication of the part being printed.

In accordance with one further aspect of the present invention, there is provided a method for printing a three-dimensional object, the method comprising the steps of:

dispensing powder 30 onto an operative surface 26 such that a plurality of powder beds 34 are formed simultaneously on the operative surface 26 adjacent to one another;

emitting an energy beam 32 onto each powder bed 34 simultaneously to melt a topmost layer of the powder bed 34 and form part of the three-dimensional object; and repeating the steps above until the three-dimensional object is completely formed.

Figure 4:
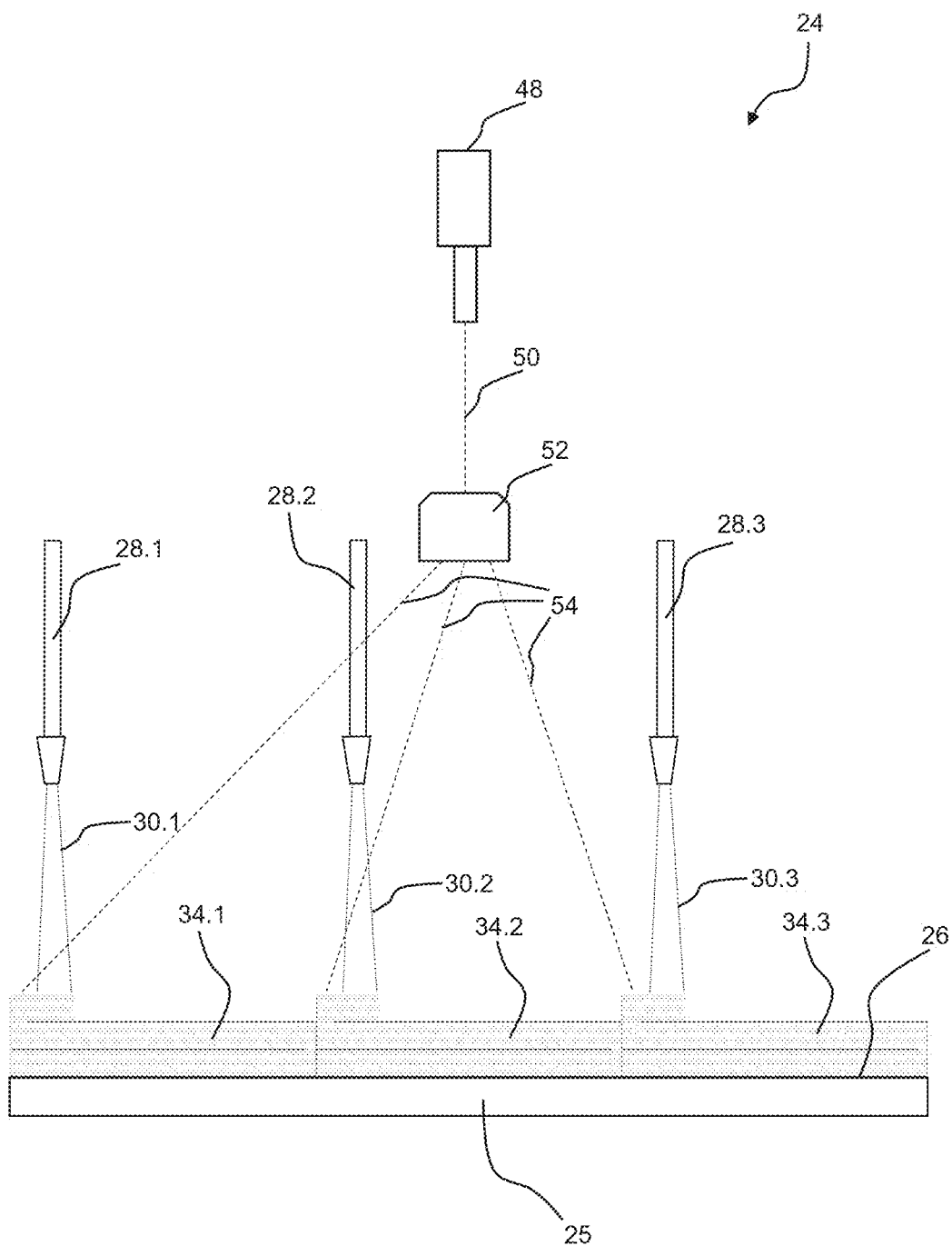
FIG. 4 is a side schematic view of a 3D printing apparatus according to a further embodiment of the present invention.

Referring to FIG. 4, there is shown a schematic representation of a 3D printing method and apparatus 24 according to a second embodiment of the present invention. The embodiment disclosed is identical in all response to the first embodiment disclosed in FIGS. 2 and 3 save that the energy source comprises a single energy gun 48 that is adapted to emit a single energy beam 50 onto an energy splitting means 52.

The energy beam splitting means 52 splits the single energy beam 50 into three individual directed energy beams 54. The energy beam splitting means 52 operates in conjunction with a control mechanism (not shown) which ensures that each directed energy beam 54 emitted from the energy beam splitting means 52 is directed, simultaneously, onto a different exposed surface of a powder bed 34 in the same manner as described above for the first embodiment of the invention.

In the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A printing apparatus for printing a three-dimensional object, comprising:
   an operative surface;
   a plurality of supply hoppers comprising a powder and configured to dispense the powder, the powder configured to be melted by an energy beam, wherein the supply hoppers are configured to form a plurality of vertically-aligned powder beds adjacent to one another on the operative surface simultaneously, and at least two supply hoppers comprise a same powder;

an energy source configured to emit an energy beam onto each powder bed simultaneously to melt or fuse a topmost layer of the powder bed onto an underlying powder bed layer or substrate; and a plurality of levelling devices each configured to level a topmost layer of powder on each powder bed.

2. The printing apparatus according to claim 1, wherein the supply hoppers are configured to form powder beds in the form of vertically aligned columns on the operative surface, each column forming a cross sectional part of the three-dimensional object.

3. The printing apparatus according to claim 1, wherein the supply hoppers are configured such that powder is dispensed onto each individual powder bed to form successive overlying layers on the powder bed.

4. The printing apparatus according to claim 1, wherein each supply hopper travels along an oscillating path that is substantially sinusoidal.

5. The printing apparatus according to claim 1, wherein each supply hopper travels along an oscillating path that conforms to a square, triangular or other wave form.

6. The printing apparatus according to claim 1, wherein the apparatus further comprises an energy splitting device configured to split a single energy beam into a plurality of individual directed energy beams.

7. The printing apparatus according to claim 1, wherein the apparatus further comprises a scanning device for determining at least one of a position, a velocity and a size of one or more particles of the powder travelling from the supply hoppers to each powder bed.

8. The printing apparatus according to claim 7, wherein the scanning device is adapted to measure a volume of the powder in each powder bed.

9. The printing apparatus according to claim 7, wherein the scanning device is adapted to measure a level of the powder in each powder bed.

10. The printing apparatus according to claim 7, wherein the scanning device is adapted to measure a topology of each powder bed or part thereof.

11. The printing apparatus according to claim 7, wherein the scanning device is adapted to measure a chemical composition of each powder bed or part thereof.

12. The printing apparatus according to claim 7, wherein the scanning device is adapted to measure a temperature of each powder bed or part thereof.

13. The printing apparatus according to claim 1, wherein the levelling device comprises a blade configured to periodically scrape an upper surface of the topmost layer of powder on each powder bed.

14. The printing apparatus according to claim 1, wherein levelling device comprises an electrostatic charging means.

15. The printing apparatus according to claim 1, wherein the levelling device comprises a vibration device for applying vibrational forces to loose powder disposed on each powder bed.

16. The printing apparatus according to claim 15, wherein the vibration device comprises a mechanical vibrator.

17. The printing apparatus according to claim 15, wherein the vibration device comprises an ultra-sonic vibrator.

* * * * *